United States Patent
Liu et al.

(10) Patent No.: US 11,650,717 B2
(45) Date of Patent: May 16, 2023

(54) USING ARTIFICIAL INTELLIGENCE TO ITERATIVELY DESIGN A USER INTERFACE THROUGH PROGRESSIVE FEEDBACK

(71) Applicant: International Business Machines Corporation, Armonk, NY (US)

(72) Inventors: Eric Liu, San Jose, CA (US); Shun Jiang, San Jose, CA (US); Aly Megahed, San Jose, CA (US); Lei Huang, Mountain View, CA (US); Peifeng Yin, San Jose, CA (US); Raphael Arar, Santa Cruz, CA (US); Guangjie Ren, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 16/507,241

(22) Filed: Jul. 10, 2019

(65) Prior Publication Data
US 2021/0011592 A1    Jan. 14, 2021

(51) Int. Cl.
*G06T 11/20* (2006.01)
*G06N 5/02* (2023.01)
(Continued)

(52) U.S. Cl.
CPC .......... *G06F 3/0484* (2013.01); *G06F 3/0482* (2013.01); *G06F 8/38* (2013.01);
(Continued)

(58) Field of Classification Search
CPC ...... G06F 8/20; G06F 3/04817; G06F 3/0484; G06F 3/0482; G06F 8/38; G06F 3/048;
(Continued)

(56) References Cited

U.S. PATENT DOCUMENTS

| | | | | |
|---|---|---|---|---|
| 10,824,401 | B2 * | 11/2020 | Ganesh | .................... G06F 8/35 |
| 2012/0054177 | A1 * | 3/2012 | Wang | ................. G06F 16/5854 |
| | | | | 707/723 |

(Continued)

OTHER PUBLICATIONS

F. Behrang, S. P. Reiss and A. Orso, "GUIFetch: Supporting App Design and Development through GUI Search," 2018 IEEE/ACM 5th International Conference on Mobile Software Engineering and Systems (MOBILESoft), 2018, pp. 236-246. (Year: 2018).*

(Continued)

*Primary Examiner* — Jennifer N Welch
*Assistant Examiner* — Kuang F Chen
(74) *Attorney, Agent, or Firm* — Robert A. Voigt, Jr.; Shackelford, Bowen, McKinley & Norton, LLP

(57) ABSTRACT

A computer-implemented method, system and computer program product for generating a user interface. A sketch (e.g., wireframe) of a portion of a user interface is received. The sketch is analyzed to predict a set of intended sketches using artificial intelligence based on historical data and/or the user's asset library. A set of intended final sketch renderings of the user interface is then generated and displayed using the set of predicted intended sketches based on historical data or a model trained to extract visual characteristics from existing user interface screens. If the user selects one of the intended final sketch renderings of the user interface as being directed to the intended design of the user interface and indicates that the selected intended final sketch rendering of the user interface corresponds to the final intended design, then code is generated to render the selected final sketch rendering of the user interface.

20 Claims, 10 Drawing Sheets

(51) Int. Cl.
*G06F 3/0484* (2022.01)
*G06F 8/38* (2018.01)
*G06F 3/0482* (2013.01)

(52) U.S. Cl.
CPC ............. *G06N 5/02* (2013.01); *G06T 11/20* (2013.01); *G06T 2200/24* (2013.01)

(58) Field of Classification Search
CPC ... G06F 8/34; G06F 8/35; G06F 9/451; G06T 11/20; G06T 2200/24; G06N 5/02; G06N 20/00
See application file for complete search history.

(56) References Cited

U.S. PATENT DOCUMENTS

| | | | | |
|---|---|---|---|---|
| 2014/0328540 | A1* | 11/2014 | Wang | G06K 9/00476 382/173 |
| 2015/0169140 | A1* | 6/2015 | Li | G06F 3/00 715/762 |
| 2016/0034441 | A1 | 2/2016 | Nguyen et al. | |
| 2016/0266878 | A1 | 9/2016 | Mankovskii | |
| 2018/0074659 | A1* | 3/2018 | Anderson | G06F 8/38 |
| 2018/0203571 | A1 | 7/2018 | Dayanandan et al. | |
| 2018/0357259 | A1* | 12/2018 | Jin | G06F 16/532 |
| 2019/0018660 | A1 | 1/2019 | Ananthapur Bache et al. | |
| 2019/0317739 | A1* | 10/2019 | Turek | G06N 3/0454 |
| 2019/0370617 | A1* | 12/2019 | Singh | G06T 11/60 |
| 2020/0134388 | A1* | 4/2020 | Rohde | G06F 8/38 |

OTHER PUBLICATIONS

Magenta, "Draw Together with a Neural Network," https://magenta.tensorflow.org/sketch-mn-demo, Jun. 26, 2017, pp. 1-5.

Microsoft, "Sketch2Code," https://www.microsoft.com/en-us/ai/ai-lab-application-samples?activetab=pivot1:primaryr3, 2018, pp. 1-5.

Benjamin Wilkins, "Thinking in Symbols for Universal Design," https://www.youtube.com/watch?v=z5XxgxBz3Fo, Sep. 7, 2017, one page.

Cusuh Ham, "Sketch-Based Image Synthesis," https://www.cc.gatech.edu/~hays/7476/projects/Cusuh/, 2018, pp. 1-7.

* cited by examiner

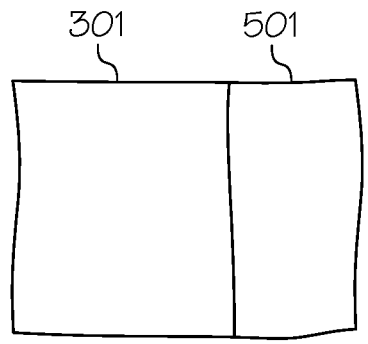
FIG. 5
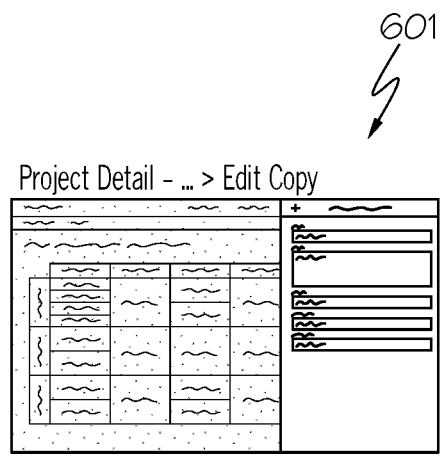
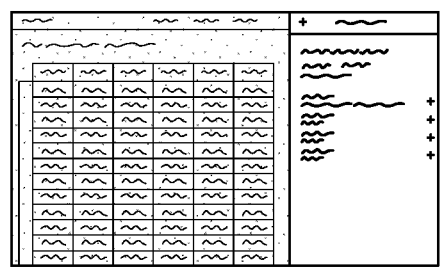
FIG. 6

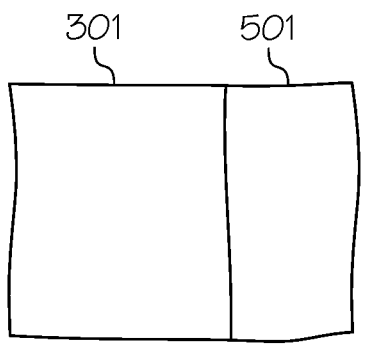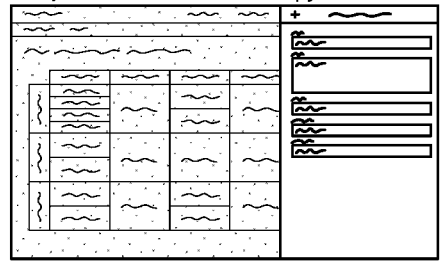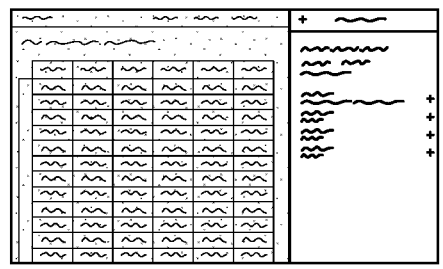
FIG. 7

USING ARTIFICIAL INTELLIGENCE TO ITERATIVELY DESIGN A USER INTERFACE THROUGH PROGRESSIVE FEEDBACK

TECHNICAL FIELD

The present invention relates generally to user interfaces, and more particularly to using artificial intelligence to iteratively design a user interface through progressive feedback.

BACKGROUND

A user interface is the space where interactions between humans and machines occur. The goal of this interaction is to allow effective operation and control of the machine from the human end, whilst the machine simultaneously feeds back information that aids the operators' decision-making process. Examples of this broad concept of user interfaces include the interactive aspects of computer systems (e.g., desktop computers, mobile devices), hand tools, heavy machinery operator controls, home appliances and process controls.

Generally, the goal of a user interface design is to produce a user interface which makes it easy, efficient, and enjoyable (user-friendly) to operate a machine in the way which produces the desired result. This generally means that the operator needs to provide minimal input to achieve the desired output, and also that the machine minimizes undesired outputs to the human.

User interface design is time consuming and typically includes hand-drawn sketches to "mockups" (high-fidelity representations of digital user interface screens) implemented in a digital design tool.

Currently, there have been recent efforts by companies to attempt to automate this process. Such efforts include translating a sketch of the entire user interface into a single final rendering output. That is, such efforts involve generating code to produce the final user interface based on a single sketch.

However, the produced final user interface may not be satisfactory to the user even if the user's sketch appears acceptable to the user. Also, such efforts do not really assist the user in actually designing the user interface. Instead, the user still spends an enormous amount of time and effort in designing the user interface. These recent efforts only assist the user in generating the code to produce the user interface as opposed to assisting the user in actually designing the user interface.

SUMMARY

In one embodiment of the present invention, a computer-implemented method for generating a user interface comprises receiving a sketch of a portion of a user interface, where the sketch is a wireframe. The method further comprises analyzing the sketch to predict a first set of intended sketches of the user interface using artificial intelligence. The method additionally comprises generating and displaying a first set of intended final sketch renderings of the user interface using the first set of predicted intended sketches of the user interface based on historical data or a model trained to extract visual characteristics from existing user interface screens. Furthermore, the method comprises receiving a selection of a first final sketch rendering of the user interface from the first set of intended final sketch renderings of the user interface. Additionally, the method comprises generating code to render the selected first final sketch rendering of the user interface in response to a user indicating the selected first final sketch rendering of the user interface is a final intended design.

In another embodiment of the present invention, a computer program product for generating a user interface, the computer program product comprising a computer readable storage medium having program code embodied therewith, the program code comprises the programming instructions for receiving a sketch of a portion of a user interface, where the sketch is a wireframe. The program code further comprises the programming instructions for analyzing the sketch to predict a first set of intended sketches of the user interface using artificial intelligence. The program code additionally comprises the programming instructions for generating and displaying a first set of intended final sketch renderings of the user interface using the first set of predicted intended sketches of the user interface based on historical data or a model trained to extract visual characteristics from existing user interface screens. Furthermore, the program code comprises the programming instructions for receiving a selection of a first final sketch rendering of the user interface from the first set of intended final sketch renderings of the user interface. Additionally, the program code comprises the programming instructions for generating code to render the selected first final sketch rendering of the user interface in response to a user indicating the selected first final sketch rendering of the user interface is a final intended design.

In a further embodiment of the present invention, a system comprises a memory for storing a computer program for generating a user interface and a processor connected to the memory. The processor is configured to execute the program instructions of the computer program that comprises receiving a sketch of a portion of a user interface, where the sketch is a wireframe. The program instructions of the computer program further comprise analyzing the sketch to predict a first set of intended sketches of the user interface using artificial intelligence. The program instructions of the computer program additionally comprise generating and displaying a first set of intended final sketch renderings of the user interface using the first set of predicted intended sketches of the user interface based on historical data or a model trained to extract visual characteristics from existing user interface screens. Furthermore, the program instructions of the computer program comprise receiving a selection of a first final sketch rendering of the user interface from the first set of intended final sketch renderings of the user interface. Additionally, the program instructions of the computer program comprise generating code to render the selected first final sketch rendering of the user interface in response to a user indicating the selected first final sketch rendering of the user interface is a final intended design.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 illustrates the user continuing to further sketch the user interface by adding additional strokes in accordance with an embodiment of the present invention;

FIG. 6 illustrates recommending intended final sketch renderings of the user interface in response to the user further sketching the user interface in accordance with an embodiment of the present invention;

FIG. 7 illustrates the user selecting one of the recommended intended final sketch renderings of the user interface in accordance with an embodiment of the present invention;

DETAILED DESCRIPTION

Figure 1:
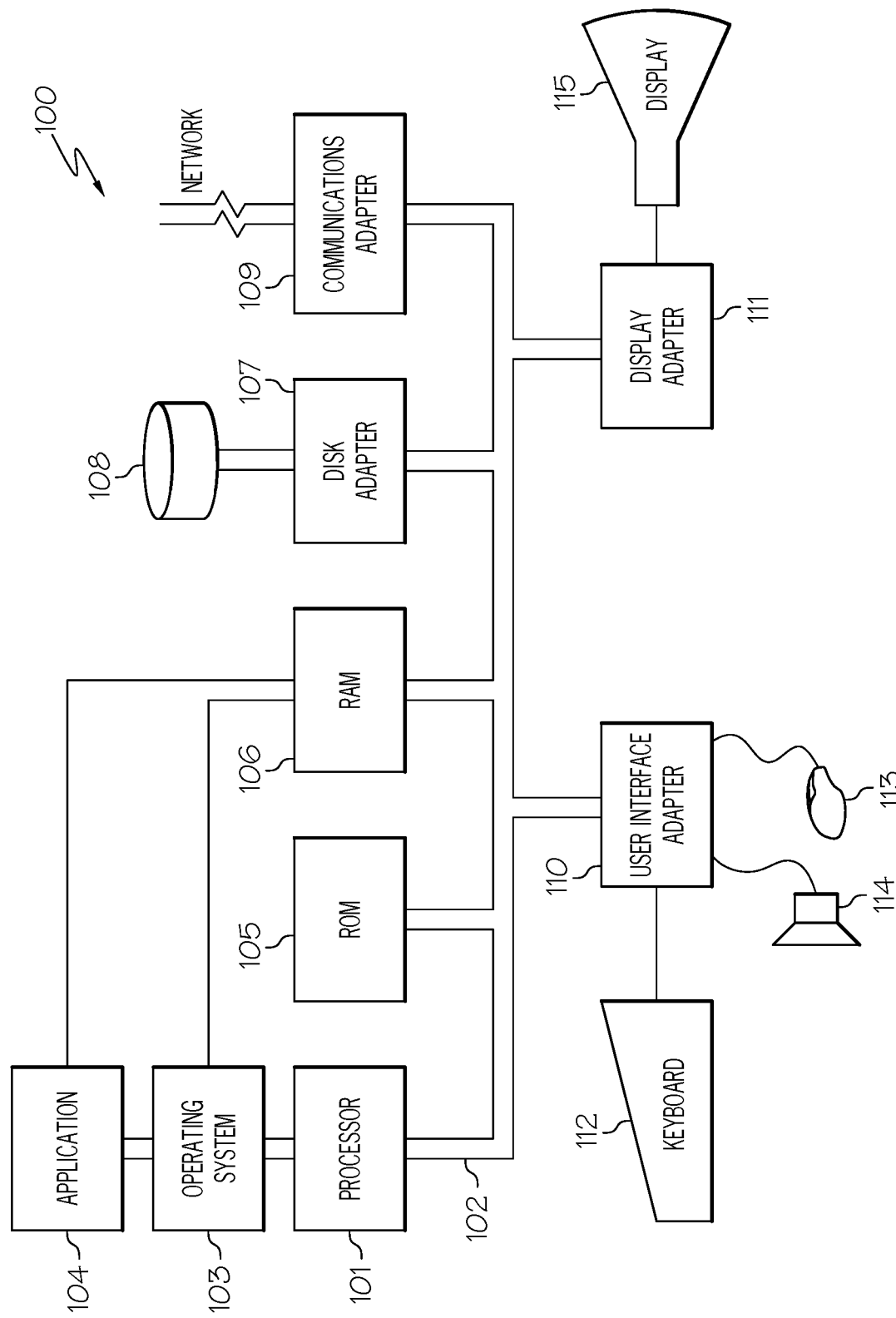
FIG. 1 illustrates an embodiment of the present invention of a hardware configuration of a computing device which is representative of a hardware environment for practicing the present invention.

The present invention comprises a computer-implemented method, system and computer program product for generating a user interface. In one embodiment of the present invention, a sketch (e.g., wireframe) of a portion of a user interface is received. The sketch is analyzed to predict a set of intended sketches using artificial intelligence based on historical data consisting of renderings of user interface designs and/or the user's asset library consisting of the user's previously designed user interfaces. A set of intended final sketch renderings of the user interface is then generated and displayed using the set of predicted intended sketches based on historical data or a model trained to extract visual characteristics from existing user interface screens. An "intended final sketch rendering," as used herein, refers to a complete rendering of a user interface. In one embodiment, the intended final sketch renderings are determined based on matching a previously rendered user interface with elements closest in appearance to the predicted intended sketches of the user interface. In one embodiment, the intended final sketch renderings are wireframes that are identified by matching the current live wireframe with the closest resembling digital wireframe from historical data. If the user selects one of the intended final sketch renderings of the user interface (provide direct feedback) and indicates that the selected intended final sketch rendering of the user interface corresponds to the final intended design, then code is generated to render the selected final sketch rendering of the user interface. The "final intended design," as used herein, refers to the user's desired design of the user interface in its complete form. If, however, after selecting the intended final sketch rendering of the user interface, the user indicated that the selected intended final sketch rendering of the user interface does not correspond to the final intended design, then a set of keyframes are generated and displayed to include the design variations between the analyzed sketch and the selected intended final sketch rendering of the user interface. A "keyframe," as used herein, refers to a design variation between the analyzed sketch and the selected intended final sketch rendering of the user interface, where the keyframe includes one or more unfinished portions. That is, a "keyframe" represents an option in designing the selected intended final sketch rendering of the user interface based on the analyzed sketch. The user may then select the keyframe (provide direct feedback) to replace the current live sketch if the selected keyframe is directed to the user interface desired to be drawn by the user. The user then continues to sketch the user interface by including strokes within the unfinished portion of the keyframe. The system then analyzes the subsequent sketch of the selected keyframe to predict further intended sketches using artificial intelligence as discussed above. In this manner, the embodiments of the present invention are able to more effectively assist the user in designing the user interface more efficiently by assisting the user iteratively during the entire design process through progressive feedback (both direct and passive feedback).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of using artificial intelligence to assist the user in iteratively designing a user interface through progressive feedback. Referring to FIG. 1, computing device 100 may have a processor 101 connected to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for using artificial intelligence to assist the user in iteratively designing a user interface through progressive feedback as discussed further below in connection with FIGS. 2A-2B and 3-11.

Referring again to FIG. 1, read-only memory ("ROM") 105 may be connected to system bus 102 and include a basic input/output system ("BIOS") that controls certain basic functions of computing device 100. Random access memory ("RAM") 106 and disk adapter 107 may also be connected to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for using artificial intelligence to assist the user in iteratively designing a user interface through progressive feedback, as discussed further below in connection with FIGS. 2A-2B and 3-11, may reside in disk unit 108 or in application 104.

Computing device 100 may further include a communications adapter 109 connected to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, the goal of a user interface design is to produce a user interface which makes it easy, efficient, and enjoyable (user-friendly) to operate a machine in the way which produces the desired result. This generally means that the operator needs to provide minimal input to achieve the desired output, and also that the machine minimizes undesired outputs to the human. User interface design is time consuming and typically includes hand-drawn sketches to "mockups" (high-fidelity representations of digital user interface screens) implemented in a digital design tool. Currently, there have been recent efforts by companies to attempt to automate this process. Such efforts include translating a sketch of the entire user interface into a single final rendering output. That is, such efforts involve generating code to produce the final user interface based on a single sketch. However, the produced final user interface may not be satisfactory to the user even if the user's sketch appears acceptable to the user. Also, such efforts do not really assist the user in actually designing the user interface. Instead, the user still spends an enormous amount of time and effort in designing the user interface. These recent efforts only assist the user in generating the code to produce the user interface as opposed to assisting the user in actually designing the user interface.

Figure 2A:
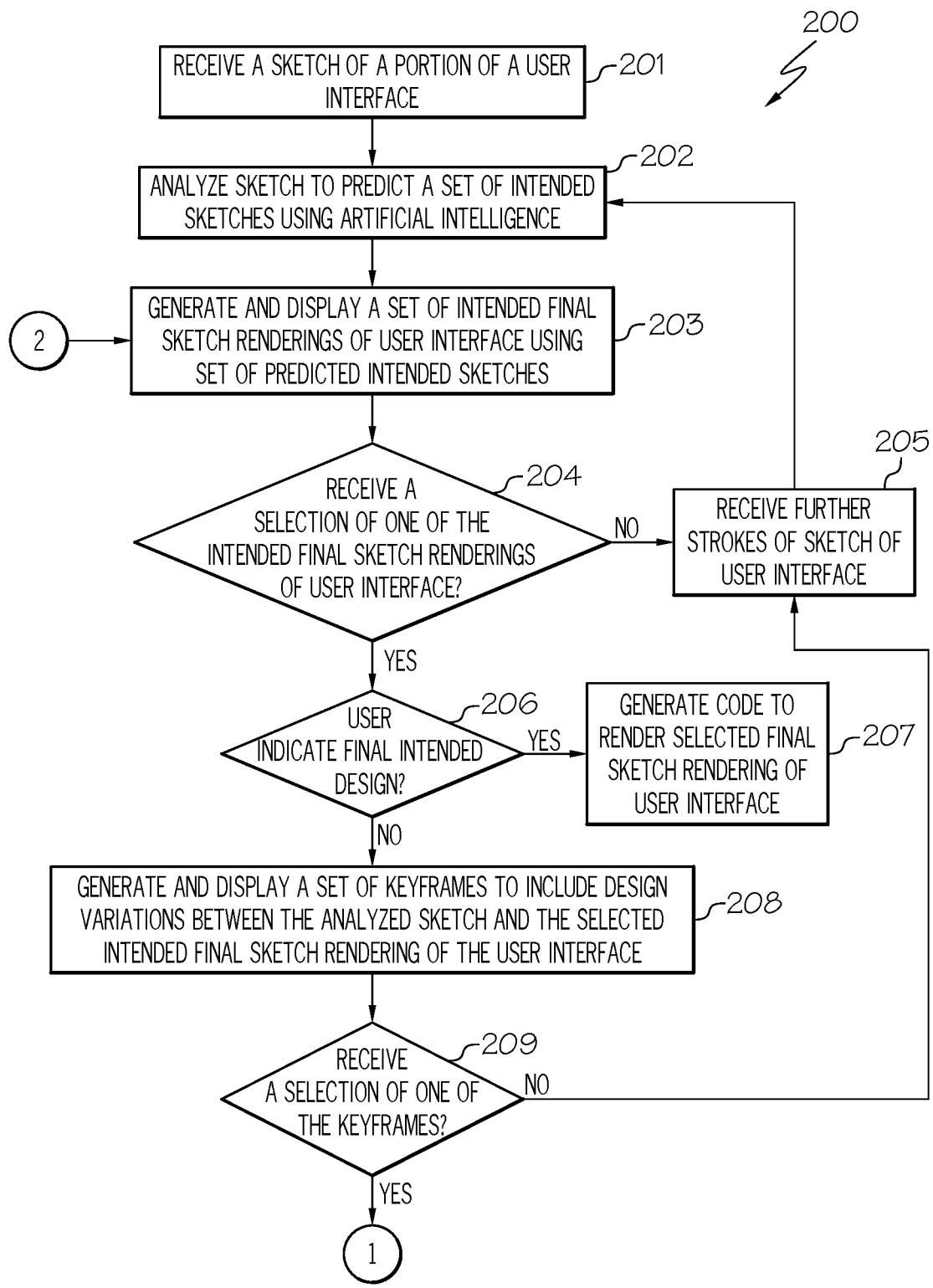
FIGS. 2A-2B are a flowchart of a method for generating a user interface through progressive feedback and iteration in accordance with an embodiment of the present invention.
Figure 2B:
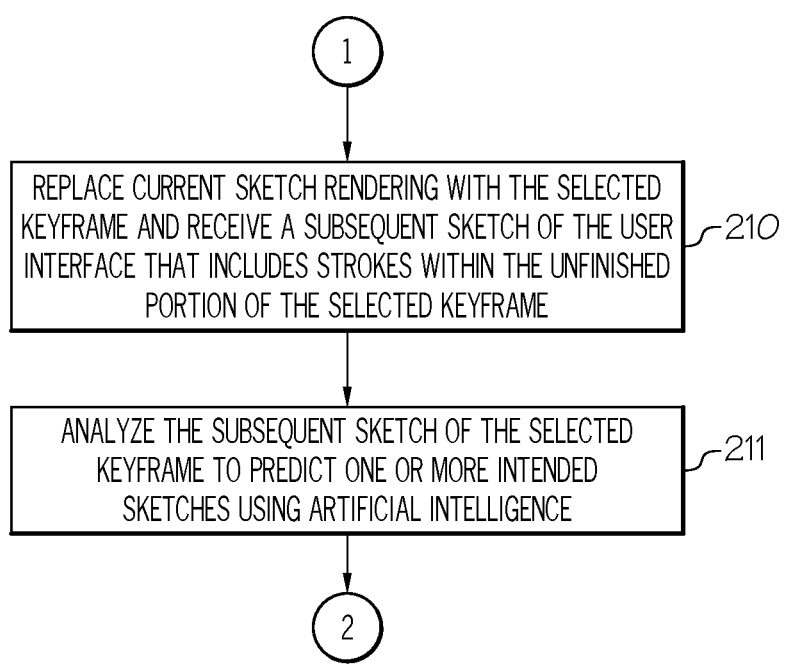
Figure 3:
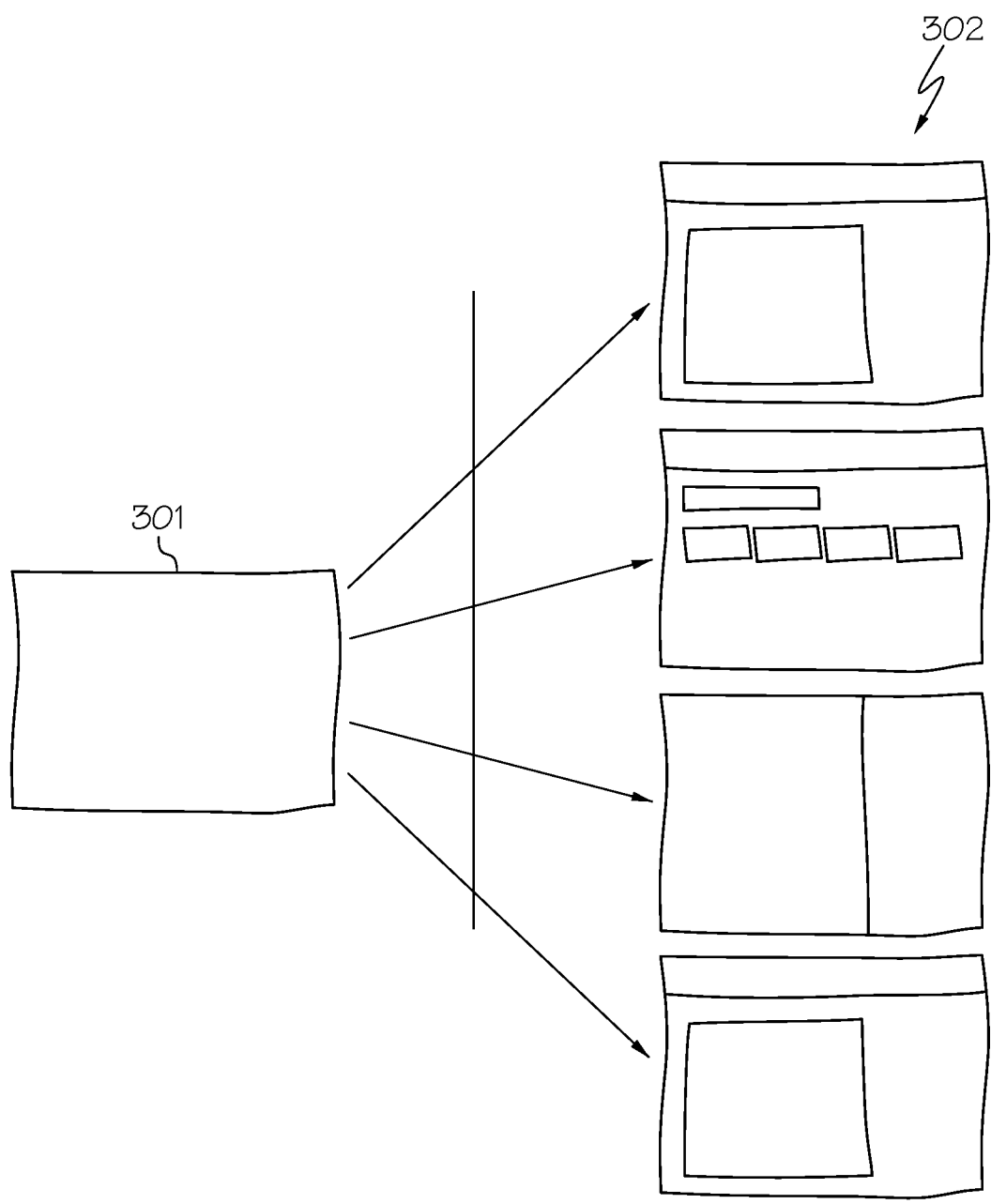
FIG. 3 illustrates system-predicted intended sketches in accordance with an embodiment of the present invention.
Figure 4:
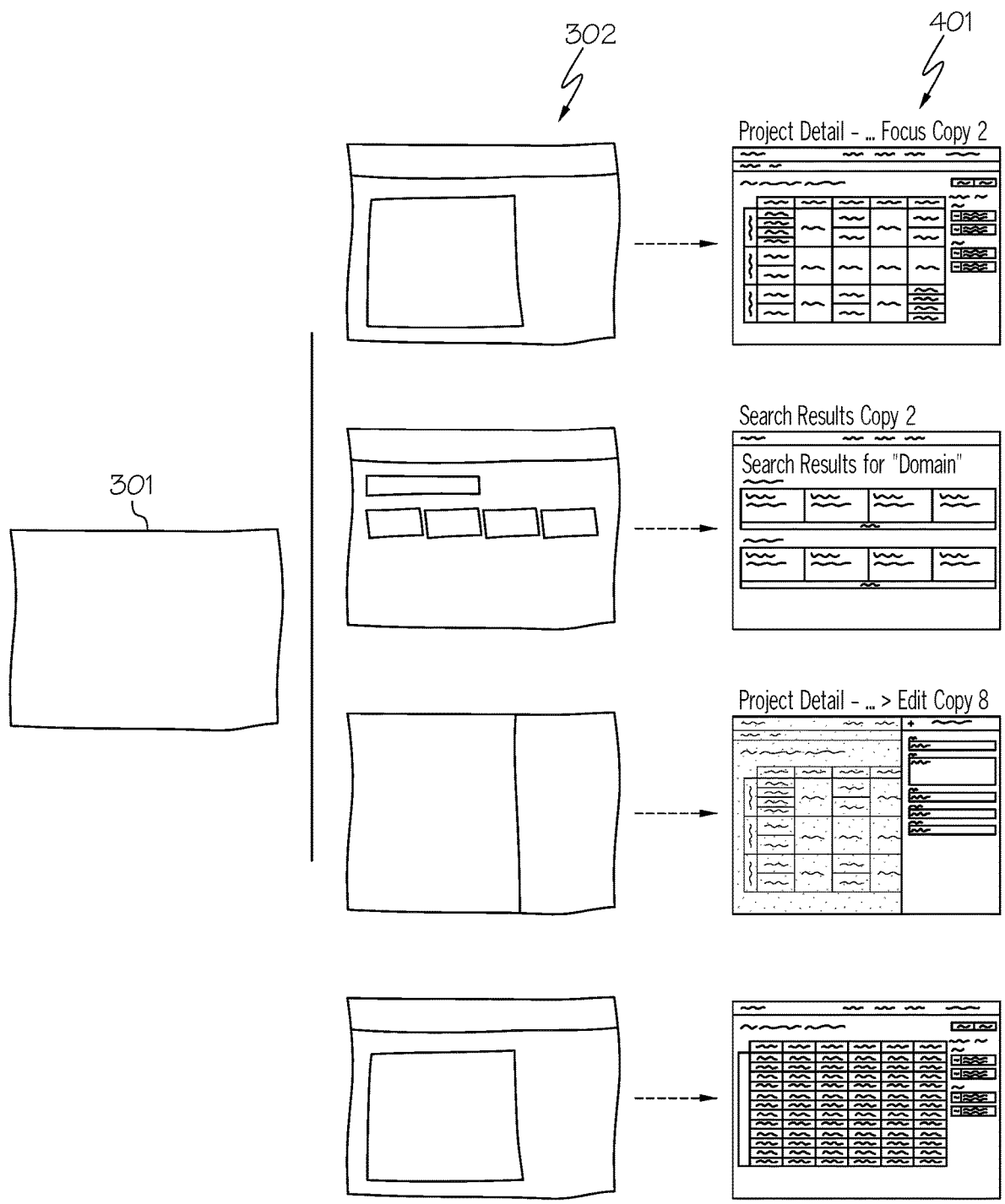
FIG. 4 illustrates system recommended intended final sketch renderings of a user interface in response to an initial sketch of the user interface in accordance with an embodiment of the present invention.
Figure 8:
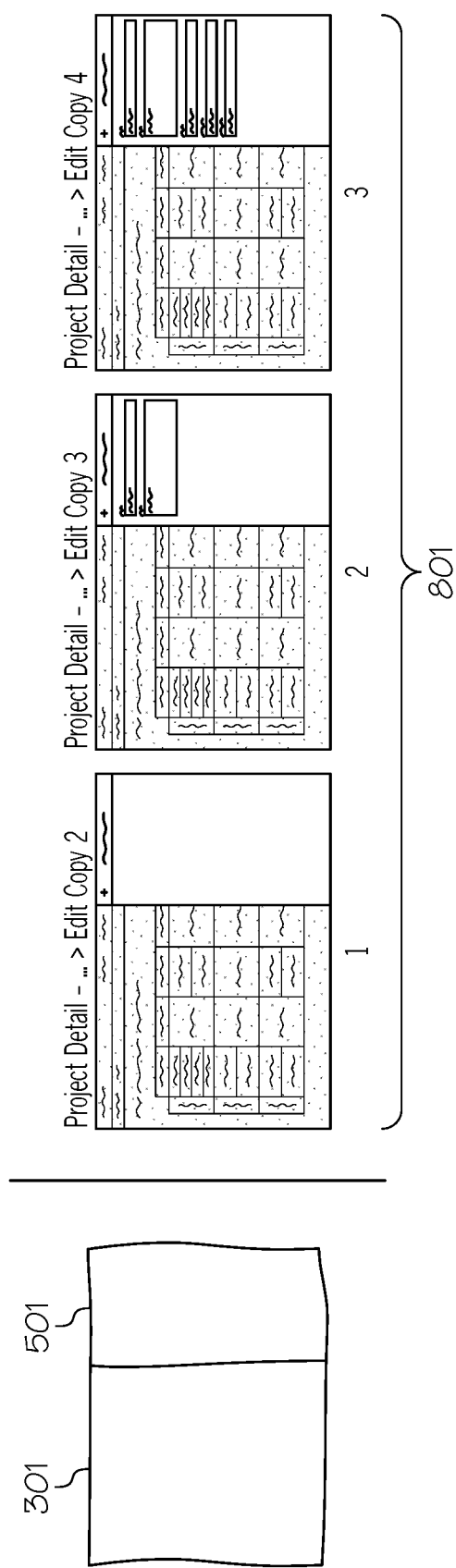
FIG. 8 illustrates the recommended keyframes which include design variations between the sketch and the selected intended final sketch rendering of the user interface in accordance with an embodiment of the present invention.
Figure 9:
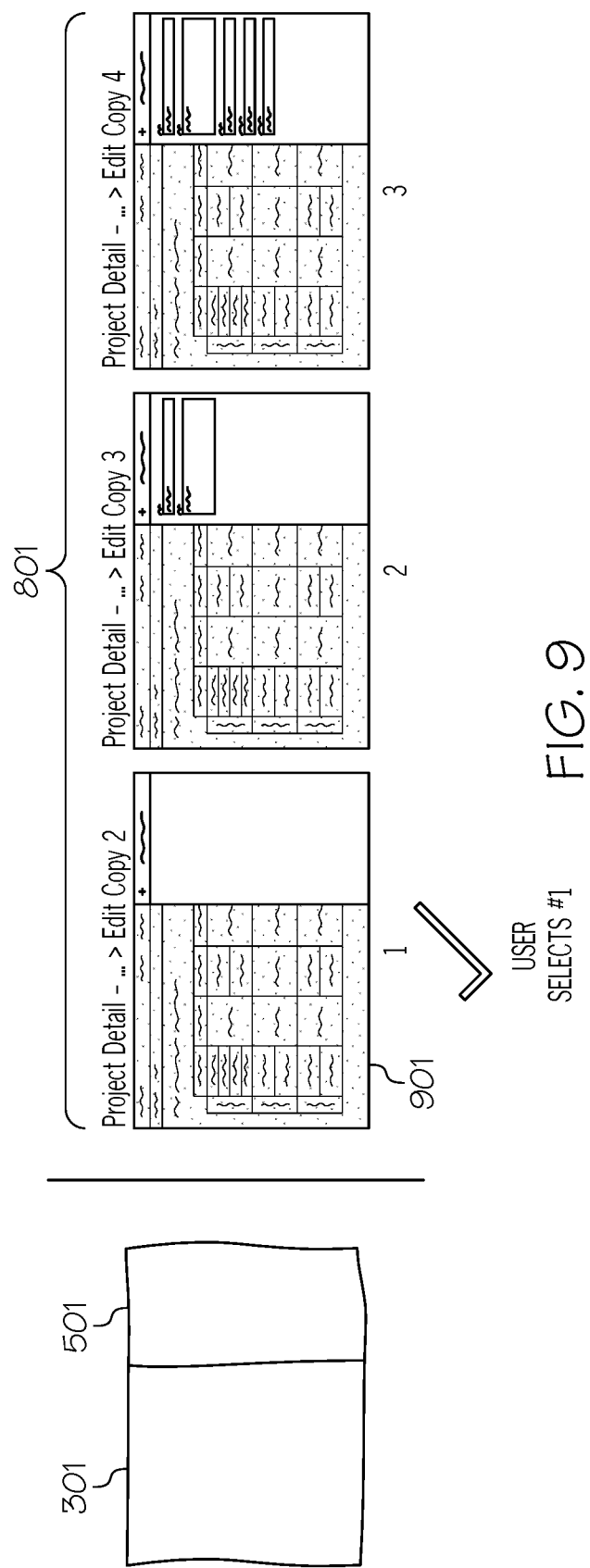
FIG. 9 illustrates the user selecting one of the keyframes in accordance with an embodiment of the present invention.
Figure 10:
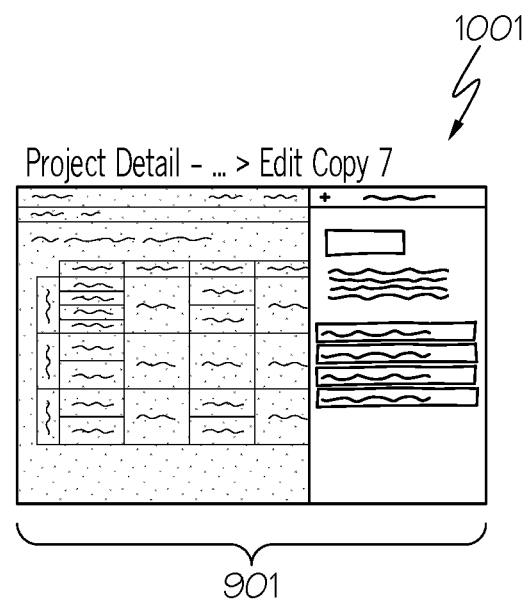
FIG. 10 illustrates the user continuing to sketch the user interface that includes strokes within the unfinished portion of the selected keyframe in accordance with an embodiment of the present invention.
Figure 11:
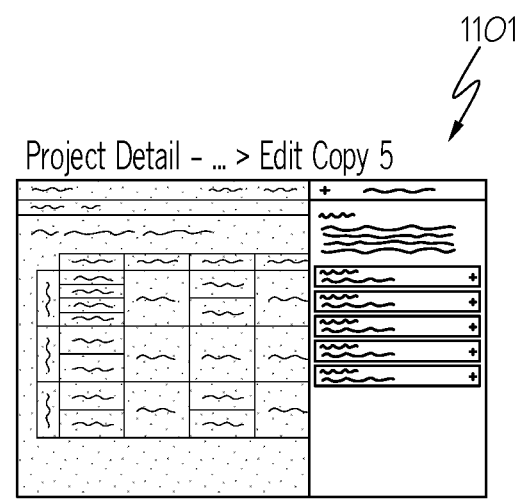
FIG. 11 illustrates the recommended final sketch rendering of the user interface which the user accepts as corresponding to the final intended design in accordance with an embodiment of the present invention.

The embodiments of the present invention provide a means for assisting the user in designing the user interface, such as a graphical user interface, iteratively during the entire design process through progressive feedback as discussed below in connection with FIGS. 2A-2B and 3-11. FIGS. 2A-2B are a flowchart of a method for generating a user interface through progressive feedback and iteration. FIG. 3 illustrates system-predicted intended sketches. FIG. 4 illustrates system recommended intended final sketch renderings of a user interface in response to an initial sketch of the user interface. FIG. 5 illustrates the user continuing to further sketch the user interface by adding additional strokes. FIG. 6 illustrates recommending intended final sketch renderings of the user interface in response to the user further sketching the user interface. FIG. 7 illustrates the user selecting one of the recommended intended final sketch renderings of the user interface. FIG. 8 illustrates the recommended keyframes which include design variations between the sketch and the selected intended final sketch rendering of the user interface. FIG. 9 illustrates the user selecting one of the keyframes. FIG. 10 illustrates the user continuing to sketch the user interface that includes strokes within the unfinished portion of the selected keyframe. FIG. 11 illustrates the recommended final sketch rendering of the user interface which the user accepts as corresponding to the final intended design.

As stated above, FIGS. 2A-2B are a flowchart of a method 200 for generating a user interface through progressive feedback and iteration in accordance with an embodiment of the present invention.

Referring to FIG. 2A, in conjunction with FIG. 1, in step 201, computing device 100 receives a sketch of a portion of a user interface as illustrated in FIG. 3. Referring to FIG. 3, FIG. 3 illustrates system-predicted intended sketches based on a user's live sketch 301 in accordance with an embodiment of the present invention. As illustrated in FIG. 3, the user's live sketch 301 is a sketch of a portion of the user interface.

In one embodiment, the sketch is a wireframe. In one embodiment, in order for the wireframe to become a screen rendering (e.g., a high-fidelity digital user interface), styles (e.g., color, contrast, shape, padding, proportion) need to be applied. Such styles may be produced by a model trained to extract visual characteristics from existing user interface screens as discussed further below.

In one embodiment, the sketch is an initial sketch of a new user interface. In another embodiment, the sketch is a continuation of a prior sketch of a user interface.

In one embodiment, a digital pen/smart pen/pointing device is used to create a sketch of a portion of the user interface, such as via a vector graphics editor.

In one embodiment, the sketch (wireframe) of a portion of the user interface corresponds to a low fidelity mobile wireframe sketch or a web wireframe sketch.

Returning to FIG. 2A, in conjunction with FIGS. 1 and 3, in step 202, computing device 100 analyzes the sketch to predict a set of intended sketches 302 using artificial intelligence based on historical data consisting of renderings of user interface designs and/or the user's asset library consisting of the user's previously designed user interfaces as shown in FIG. 3.

In one embodiment, the historical data includes previously rendered user interface screens of existing software applications. In one embodiment, such historical data is used to identify a set of sketches intended to be drawn by the user ("set of intended sketches"), such as by matching those historically rendered user interfaces to the sketch performed by the user. In one embodiment, such intended sketches are ranked based on how closely they match the user's sketch. In this context, "matching," as used herein, refers to the correlation between the wire frame of the sketch and the wire frame of the historically rendered user interface being above a threshold degree of correlation.

In step 203, computing device 100 generates and displays a set of intended final sketch renderings of the user interface using the set of predicted intended sketches based on historical data or a model trained to extract visual characteristics from existing user interface screens as shown in FIG. 4. FIG. 4 illustrates system recommended intended final sketch renderings 401 of a user interface in response to an initial sketch 301 of the user interface. As shown in FIG. 4, computing device 100 generates and displays a set of intended final sketch renderings 401 of the user interface using the set of predicted intended sketches 302. An "intended final sketch rendering," as used herein, refers to a complete rendering of a user interface.

As discussed above, the intended final sketch renderings of the user interface are generated using the set of predicted intended sketches based on historical data or a model trained to extract visual characteristics from existing user interface screens.

In one embodiment, a model is trained to extract visual characteristics from existing user interface screens. After training the model, the model may be applied to make the visual characteristics of the current recommended renderings consistent with those in the existing user interface screens, such as the existing user interface screens of the application for which the user is designing a user interface screen.

In one embodiment, the model of the present invention is an encoder/decoder model that is trained on information from user interface metadata and screenshots of the user interfaces to translate the screenshots into a domain specific language and then into code.

In one embodiment, a classifier may be utilized to detect and classify user interface components within the image (image of the user interface). After classification of the interface components, the model is trained on information from the component metadata and the screenshots of the user interface to translate the screenshots into a domain specific language and then into code.

In one embodiment, the intended final sketch renderings are determined based on matching a previously rendered user interface (historical data) with elements closest in appearance to the predicted intended sketches of the user interface. In one embodiment, such previously rendered user interfaces are the user's prior user interface designs. In one embodiment, such previously rendered user interfaces may be stored in a database accessible by computing device 100.

In one embodiment, the intended final sketch renderings are wireframes that are identified by matching the current live wireframe with the closest resembling digital wireframes (digital wireframes of user interface designs) from historical data, such as digital wireframes stored in a database accessible by computing device 100.

In one embodiment, a wireframe is represented in a tree-like structure, where the branches of the tree structure are container layouts and the nested user interface elements are the nodes/leaves. Matching may then be reduced to identifying two trees with the most similar branches and leaves.

In one embodiment, styling rules may be generated and applied by a model, such as the model discussed above that is trained to make the visual characteristics of the current recommended renderings consistent with those in the existing user interface screens, such as the existing user interface screens of the application for which the user is designing a user interface screen. Styling rules may include the color, contrast, shape, padding and proportion of the elements in the user interface which are applied to the final sketch rendering to render the user interface in a high-fidelity manner.

In one embodiment, styling rules are generated based on generating wireframes of the predicted intended sketches of the user interface, where each wireframe is represented in a tree structure, where the branch represents the container layout and the leaf node represents the user interface elements. Furthermore, the styles (styling rules) are attached to the branch and leaf nodes accordingly. In one embodiment, a training dataset is generated, where the node in the tree structure contributes multiple data points. For each data point, the value is a combination of: the path of the node in the tree structure and its type; the path of sibling nodes in the tree structure and their types; and the path of ancestor nodes in the tree structure and their types. In one embodiment, the label is the styling code. The model may then be trained from the training dataset where the input is the node in a tree structure with the sibling and ancestor information and the output is the styling rules.

Concerning applying the styling rules, in one embodiment, for all the nodes in the tree structure of the wireframe, the styling rules model discussed above is applied to obtain the styling code for each node. A screen with the wireframe represented in a tree structure annotated with the styling code is then generated.

In one embodiment, for user interface elements that do not exist in the historical data, the user interface styling will be applied according to the context of the region of the user interface that includes those user interface elements that do not exist in the historical data.

In one embodiment, the intended final sketch renderings of the user interface are presented to the user as screens in a user interface design as shown in FIG. 4.

In one embodiment, the intended final sketch renderings are generated by the system during pauses of the user's live sketching process.

Returning to FIG. 2A, in conjunction with FIGS. 1 and 3-4, in step 204, a determination is made by computing device 100 as to whether the user selected one of the intended final sketch renderings as being the user interface desired to be drawn by the user.

If the user did not select one of the intended final sketch renderings, then computing device 100 receives further strokes of a sketch of the user interface in step 205, such as shown in FIG. 5. By the user not selecting one of the intended sketch final renderings, the user provides feedback to the system indicating that none of the intended final sketch renderings are directed to the user interface desired to be drawn by the user. If, however, the user selected one of the intended final sketch renderings of the user interface, then the user provides feedback to the system indicating that the selected intended final sketch rendering of the user interface is directed to the user interface desired to be drawn by the user. Such information is used by the system to more accurately recommend relevant sketch renderings of a user interface to the user.

FIG. 5 illustrates the user continuing to further sketch the user interface by adding additional strokes in accordance with an embodiment of the present invention. As shown in FIG. 5, the user provides additional strokes forming an additional element 501 of the sketch of the user interface. Based on these new strokes, computing device 100 analyzes the sketch to predict a new set of intended sketches using artificial intelligence in step 202 followed by generating and displaying a new set of intended final sketch renderings from the new set of intended sketches in step 203 as shown in FIG. 6. In this manner, the recommended renderings of the user interface are interactively refreshed based on the user's strokes other than being a single, static recommendation.

FIG. 6 illustrates recommending new intended final sketch renderings of the user interface in response to the user further sketching the user interface in accordance with an embodiment of the present invention. As shown in FIG. 6, computing device 100 generates and displays a new set of intended final sketch renderings 601 based on the new predicted set of intended sketches.

Referring to step 204 of FIG. 2A, if, however, computing device 100 received a selection of one of the intended final sketch renderings of the user interface as shown in FIG. 7, then, in step 206, a determination is made by computing device 100 as to whether the user indicated that the selected intended final sketch rendering of the user interface corresponded to the final intended design. The "final intended design," as used herein, refers to the user's desired design of the user interface in its complete form. FIG. 7 illustrates the user selecting one of the recommended intended final sketch renderings of the user interface in accordance with an embodiment of the present invention.

As shown in FIG. 7, the user selects the intended final sketch rendering 701 of the user interface. In one embodiment, the user may make such a selection, such as via a radio button, a check box or a list box, to indicate that the intended final sketch rendering 701 of the user interface corresponds to the user's desired design of the user interface.

Returning to FIG. 2A, in conjunction with FIGS. 1 and 3-7, if the user indicated that the selected final sketch rendering of the user interface corresponded to the final intended design, such as via a radio button, a check box or a list box, then, in step 207, computing device 100 generates the code to render the selected final sketch rendering of the user interface.

If, however, the user did not indicate that the selected final sketch rendering of the user interface was the final intended design, then, in step 208, computing device 100 generates and displays a set of keyframes to include the design variations between the analyzed sketch and the selected intended final sketch rendering of the user interface as shown in FIG. 8.

A "keyframe," as used herein, refers to a design variation between the analyzed sketch and the selected intended final sketch rendering of the user interface. That is, a "keyframe" represents an option in designing the selected intended final sketch rendering of the user interface based on the analyzed sketch. In one embodiment, each keyframe includes at least one unfinished portion to be sketched by the user. Furthermore, each keyframe includes at least one finished portion of the user interface.

Referring to FIG. 8, FIG. 8 illustrates the recommended keyframes which include the design variations between the sketch and the selected intended final sketch rendering of the user interface in accordance with an embodiment of the present invention.

As shown in FIG. 8, keyframes 801 are generated based on the user's live sketch (elements 301, 501). In one embodiment, such keyframes 801 may be sorted based upon completion. For example, in one embodiment, those keyframes 801 that are less completed may be displayed prior to those keyframes 801 that are more completed as shown in FIG. 8.

In one embodiment, only a certain number or percentage of keyframes 801 is displayed, such as based on a user-indicated threshold (e.g., a particular number, a particular percentage).

In one embodiment, keyframes 801 are ranked based on how similar the keyframe is to the user's live sketch, such as via similarity scores, as discussed further below.

In one embodiment, keyframes are generated for each screen with the applied styles by generating wireframes represented in a tree structure where the branch represents the container layout and the leaf nodes represent the user interface elements. In one embodiment, from the sketch-rendering-in-progress, wireframes $W_s$ represented in a tree structure are generated as discussed above. For each $W_s$ and $W_x$ pair, where $1 \leq x \leq N$, N being a positive integer number, the following steps may be utilized: (1) all the structures on the editing path from $W_s$ to $W_x$ are found; (2) wireframes from above the structures ("above wireframes") are generated as phased keyframe wireframes; and (3) the model, discussed above, is applied to the above wireframes to generate screens with the applied styles as unranked phased keyframes.

In one embodiment, the keyframes are ranked using the following steps. From the user feedback, N sketch rendering pairs $P_i$, where $1 \leq i \leq N$, N being a positive integer number, are obtained from historic data in each $P_i$. In one embodiment, $P_i$ corresponds to the pair of $S_{Ai}$ and $S_{Bi}$, where $S_{Ai}$ is the starting point of one editing pass and $S_{Bi}$ is the ending point of the editing pass. A similarity score may then be calculated from the current hybrid sketch-rendering-in-progress to $S_{Ai}$ in all pairs, where the similarity score is normalized into a number $W_i$, where $0 \leq W_i \leq 1$. The similarity distance $D_{ij}$ is calculated between all the unranked phased keyframes $K_j$ to $S_{Bi}$ of all pairs. The phased keyframes are then ranked by using the similarity distance $D_{ij}$ and $W_i$, such as by multiplying them.

In one embodiment, based on the user feedback (selecting or not selecting a keyframe), the system trains the keyframe ranking to lessen the distance in similarity in order to generate fewer, more relevant keyframes.

Returning to FIG. 2A, in conjunction with FIGS. 1 and 3-8, in step 209, a determination is made by computing device 100 as to whether the user has selected one of the displayed keyframes as corresponding to a desired step in designing the user's desired user interface, where the selected keyframe includes elements of the user interface desired to be included in the final design of the user interface.

If the user did not select one of the displayed keyframes, then the user continues to sketch the user interface by providing further stokes of the sketch of the user interface to computing device 100 in step 205. By the user not selecting one of the keyframes, the user provides feedback to the system indicating that none of the keyframes are directed to the user interface desired to be drawn by the user. If, however, the user selected one of the keyframes of the user interface, then the user provides feedback to the system indicating that the selected keyframe is directed to the user interface desired to be drawn by the user. In one embodiment, the system uses both direct feedback (e.g., selection) and passive feedback (e.g., no selection and the user continues drawing) to train the keyframe ranking to provide fewer, more relevant keyframes to the user.

Referring to FIG. 2B, in conjunction with FIGS. 1 and 3-8, if, however, the user selected one of the displayed keyframes as shown in FIG. 9, then, in step 210, computing device 100 replaces the current sketch rendering with the selected keyframe and receives a subsequent sketch of the user interface that includes strokes within the unfinished portion of the selected keyframe as shown in FIG. 10.

FIG. 9 illustrates the user selecting one of the keyframes in accordance with an embodiment of the present invention. Referring to FIG. 9, user selects keyframe 901 of the displayed keyframes 801.

After selecting one of the keyframes, the user continues to sketch the user interface by including strokes within the unfinished portion of the selected keyframe as shown in FIG. 10 in accordance with an embodiment of the present invention.

Referring to FIG. 10, the user continues to sketch in the unfinished portion 1001 of the selected keyframe 901.

Returning to FIG. 2B, in conjunction with FIGS. 1 and 3-10, in step 211, computing device 100 analyzes the subsequent sketch of the selected keyframe to predict one or more intended sketches using artificial intelligence as discussed above in connection with step 202. A set of intended final sketch renderings from the set of predicted intended sketches is then generated and displayed by computing device 100 in step 203. The user may then accept one of these intended fetch sketch renderings as the final intended design as shown in FIG. 11.

Referring to FIG. 11, FIG. 11 illustrates the recommended final sketch rendering 1101 of the user interface which the user accepts as corresponding to the final intended design.

In this manner, the embodiments of the present invention are able to more effectively assist the user in designing the user interface more efficiently by assisting the user iteratively during the entire design process through progressive feedback (both direct and passive feedback). Users are able to more quickly design a user interface by having recommended sketch renderings be generated with added elements at a faster rate compared to manual generation. That is, users are able to produce digital renderings of the user interface in as few steps as possible.

Furthermore, the present invention improves the technology or technical field involving user interface design. As discussed above, the goal of a user interface design is to produce a user interface which makes it easy, efficient, and enjoyable (user-friendly) to operate a machine in the way which produces the desired result. This generally means that the operator needs to provide minimal input to achieve the desired output, and also that the machine minimizes undesired outputs to the human. User interface design is time consuming and typically includes hand-drawn sketches to "mockups" (high-fidelity representations of digital user interface screens) implemented in a digital design tool. Currently, there have been recent efforts by companies to attempt to automate this process. Such efforts include translating a sketch of the entire user interface into a single final rendering output. That is, such efforts involve generating code to produce the final user interface based on a single sketch. However, the produced final user interface may not be satisfactory to the user even if the user's sketch appears acceptable to the user. Also, such efforts do not really assist the user in actually designing the user interface. Instead, the user still spends an enormous amount of time and effort in designing the user interface. These recent efforts only assist the user in generating the code to produce the user interface as opposed to assisting the user in actually designing the user interface.

The present invention improves such technology by enabling the user to iteratively design the user interface through progressive feedback, such as by automating the rendering of user interface elements or patterns via high-fidelity intended sketch renderings of the user interface. By enabling the user to iteratively design a user interface, a more accurate user interface is able to be rendered in a more efficient manner as opposed to requiring the user to sketch the entirety of the user interface and then utilizing a design tool to generate the code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating a user interface through progressive feedback, the method comprising:

receiving a sketch of a portion of a user interface, wherein said sketch is a wireframe;

analyzing said sketch to predict a first set of intended sketches of said user interface using artificial intelligence based on historical data consisting of renderings of user interface designs, wherein said historical data comprises previously rendered user interface screens of existing software applications;

generating and displaying a first set of intended final sketch renderings of said user interface using said first set of predicted intended sketches of said user interface based on a model trained to extract visual characteristics from existing user interface screens;

receiving a selection of a first final sketch rendering of said user interface from said first set of intended final sketch renderings of said user interface; and generating code to render said selected first final sketch rendering of said user interface in response to a user indicating said selected first final sketch rendering of said user interface is a final intended design.

2. The method as recited in claim 1 further comprising:

generating and displaying a first set of keyframes to include design variations between said sketch and said selected first final sketch rendering of said user interface in response to said user not indicating said selected first final sketch rendering of said user interface is said final intended design, wherein said first set of keyframes are various options in designing said selected first final sketch rendering of said user interface based on said sketch, wherein each of said first set of keyframes has one or more unfinished portions.

3. The method as recited in claim 2 further comprising:

receiving a selection of one of said first set of keyframes comprising at least one unfinished portion;

receiving a subsequent sketch of said user interface that includes strokes within said at least one unfinished portion of said selected keyframe;

analyzing said subsequent sketch of said user interface to predict a second set of intended sketches of said user interface using artificial intelligence;

generating and displaying a second set of intended final sketch renderings of said user interface using said second set of predicted intended sketches of said user interface;

receiving a selection of a second final sketch rendering of said user interface from said second set of intended final sketch renderings of said user interface; and generating code to render said selected second final sketch rendering of said user interface in response to said user indicating said selected second final sketch rendering of said user interface is said final intended design.

4. The method as recited in claim 1, wherein said first set of intended final sketch renderings of said user interface is determined based on matching previously rendered user interfaces with elements closest in appearance to said first set of predicted intended sketches of said user interface.

5. The method as recited in claim 1, wherein said model comprises an encoder/decoder model that is trained on information from user interface metadata and screenshots of user interfaces to translate said screenshots into a domain specific language and then into code.

6. The method as recited in claim 1, wherein said model is trained on information from user interface component metadata and screenshots of user interfaces to translate said screenshots into a domain specific language and then into code, wherein said model is trained after classification of user interface components.

7. The method as recited in claim 1, wherein said sketch is a continuation of a prior sketch of said user interface.

8. A computer program product for generating a user interface through progressive feedback, the computer program product comprising a non-transitory computer readable storage medium having program code embodied therewith, the program code comprising the programming instructions for:
receiving a sketch of a portion of a user interface, wherein said sketch is a wireframe;
analyzing said sketch to predict a first set of intended sketches of said user interface using artificial intelligence based on historical data consisting of renderings of user interface designs, wherein said historical data comprises previously rendered user interface screens of existing software applications;
generating and displaying a first set of intended final sketch renderings of said user interface using said first set of predicted intended sketches of said user interface based on a model trained to extract visual characteristics from existing user interface screens;
receiving a selection of a first final sketch rendering of said user interface from said first set of intended final sketch renderings of said user interface; and
generating code to render said selected first final sketch rendering of said user interface in response to a user indicating said selected first final sketch rendering of said user interface is a final intended design.

9. The computer program product as recited in claim 8, wherein the program code further comprises the programming instructions for:
generating and displaying a first set of keyframes to include design variations between said sketch and said selected first final sketch rendering of said user interface in response to said user not indicating said selected first final sketch rendering of said user interface is said final intended design, wherein said first set of keyframes are various options in designing said selected first final sketch rendering of said user interface based on said sketch, wherein each of said first set of keyframes has one or more unfinished portions.

10. The computer program product as recited in claim 9, wherein the program code further comprises the programming instructions for:
receiving a selection of one of said first set of keyframes comprising at least one unfinished portion;
receiving a subsequent sketch of said user interface that includes strokes within said at least one unfinished portion of said selected keyframe;
analyzing said subsequent sketch of said user interface to predict a second set of intended sketches of said user interface using artificial intelligence;
generating and displaying a second set of intended final sketch renderings of said user interface using said second set of predicted intended sketches of said user interface;
receiving a selection of a second final sketch rendering of said user interface from said second set of intended final sketch renderings of said user interface; and
generating code to render said selected second final sketch rendering of said user interface in response to said user indicating said selected second final sketch rendering of said user interface is said final intended design.

11. The computer program product as recited in claim 8, wherein said first set of intended final sketch renderings of said user interface is determined based on matching previously rendered user interfaces with elements closest in appearance to said first set of predicted intended sketches of said user interface.

12. The computer program product as recited in claim 8, wherein said model comprises an encoder/decoder model that is trained on information from user interface metadata and screenshots of user interfaces to translate said screenshots into a domain specific language and then into code.

13. The computer program product as recited in claim 8, wherein said model is trained on information from user interface component metadata and screenshots of user interfaces to translate said screenshots into a domain specific language and then into code, wherein said model is trained after classification of user interface components.

14. The computer program product as recited in claim 8, wherein said sketch is a continuation of a prior sketch of said user interface.

15. A system, comprising:
a memory for storing a computer program for generating a user interface through progressive feedback; and
a processor connected to said memory, wherein said processor is configured to execute the program instructions of the computer program comprising:
receiving a sketch of a portion of a user interface, wherein said sketch is a wireframe;
analyzing said sketch to predict a first set of intended sketches of said user interface using artificial intelligence based on historical data consisting of renderings of user interface designs, wherein said historical data comprises previously rendered user interface screens of existing software applications;
generating and displaying a first set of intended final sketch renderings of said user interface using said first set of predicted intended sketches of said user interface based on a model trained to extract visual characteristics from existing user interface screen;
receiving a selection of a first final sketch rendering of said user interface from said first set of intended final sketch renderings of said user interface; and
generating code to render said selected first final sketch rendering of said user interface in response to a user indicating said selected first final sketch rendering of said user interface is a final intended design.

16. The system as recited in claim 15, wherein the program instructions of the computer program further comprise:
generating and displaying a first set of keyframes to include design variations between said sketch and said selected first final sketch rendering of said user interface in response to said user not indicating said selected first final sketch rendering of said user interface is said final intended design, wherein said first set of keyframes are various options in designing said selected first final sketch rendering of said user interface based on said sketch, wherein each of said first set of keyframes has one or more unfinished portions.

17. The system as recited in claim 16, wherein the program instructions of the computer program further comprise:
receiving a selection of one of said first set of keyframes comprising at least one unfinished portion;
receiving a subsequent sketch of said user interface that includes strokes within said at least one unfinished portion of said selected keyframe;
analyzing said subsequent sketch of said user interface to predict a second set of intended sketches of said user interface using artificial intelligence;
generating and displaying a second set of intended final sketch renderings of said user interface using said second set of predicted intended sketches of said user interface;
receiving a selection of a second final sketch rendering of said user interface from said second set of intended final sketch renderings of said user interface; and
generating code to render said selected second final sketch rendering of said user interface in response to said user indicating said selected second final sketch rendering of said user interface is said final intended design.

18. The system as recited in claim 15, wherein said first set of intended final sketch renderings of said user interface is determined based on matching previously rendered user interfaces with elements closest in appearance to said first set of predicted intended sketches of said user interface.

19. The system as recited in claim 15, wherein said model comprises an encoder/decoder model that is trained on information from user interface metadata and screenshots of user interfaces to translate said screenshots into a domain specific language and then into code.

20. The system as recited in claim 15, wherein said model is trained on information from user interface component metadata and screenshots of user interfaces to translate said screenshots into a domain specific language and then into code, wherein said model is trained after classification of user interface components.

* * * * *